Sept. 8, 1931.  W. R. BULL ET AL  1,822,079
SHOCK ABSORBING MECHANISM
Filed May 18, 1931
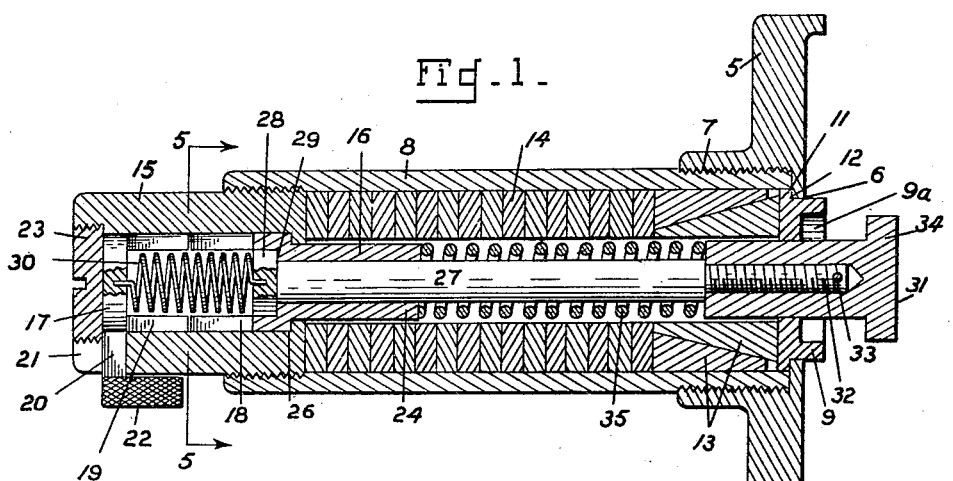
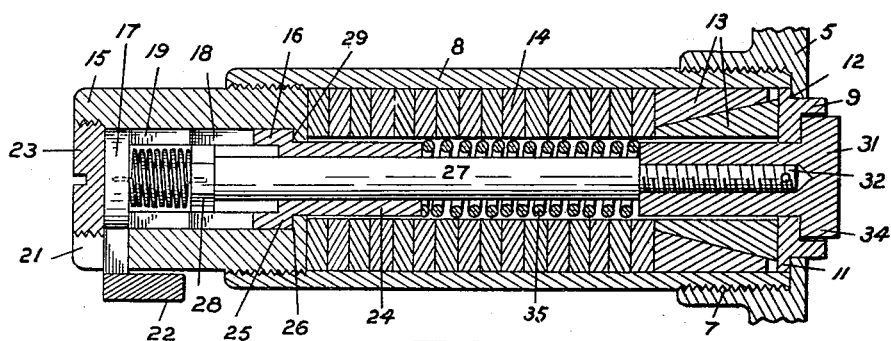
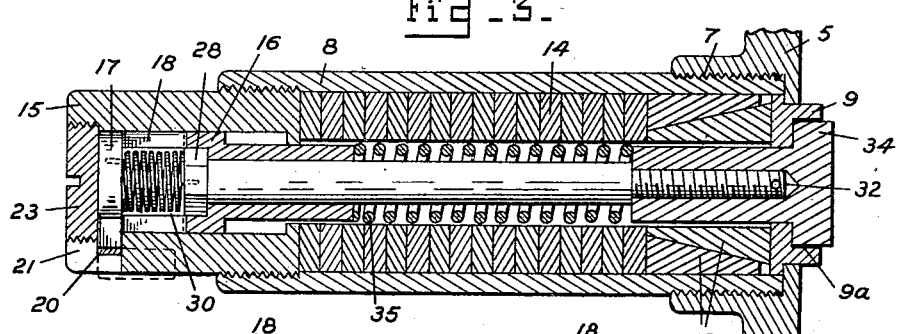
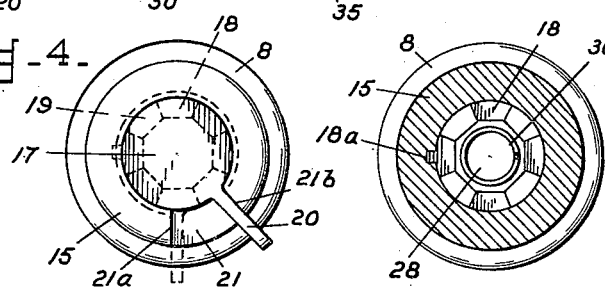
INVENTORS
William R. Bull
Clarence E. Simpson
BY
W. N. Roach
ATTORNEY Patented Sept. 8, 1931

1,822,079

UNITED STATES PATENT OFFICE

WILLIAM R. BULL, OF LONGMEADOW, AND CLARENCE E. SIMPSON, OF SPRINGFIELD, MASSACHUSETTS

SHOCK ABSORBING MECHANISM

Application filed May 18, 1931. Serial No. 538,198.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to us of any royalty thereon.

This invention relates to shock absorbing mechanism.

The purpose of the invention is to provide a compound shock absorbing mechanism in which one of the shock absorbing elements may be inoperated to meet special conditions.

The invention is characterized by the novel and compact association of two different types of shock absorbing devices, the primary device disposed within the secondary device and adapted to be inoperated.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a longitudinal sectional view of the improved shock absorbing mechanism showing the parts in normal out of action position.

Fig. 2 is a similar view showing the position of the parts when in action.

Fig. 3 is a similar view showing one of the elements inoperated.

Fig. 4 is a rear end view.

Fig. 5 is a detail sectional view on the lines 5—5 of Fig. 1.

Referring to the drawings by numerals of reference:

There is shown a support 5 formed with an aperture 6 including a tapped counterbore 7 for receiving a barrel 8. An impact member 9 slidably mounted in the forward end of the barrel protrudes through the aperture 6 in the support and has a collar 11 engageable with the shoulder 12 of the support to limit forward movement of the impact member.

A pair of metallic annular wedges 13—13 mounted in the barrel and arranged with the inner wedge engaging the impact member, confine a series of rings 14 composed of a resilient material such as cork or fibre. The rings are retained by a tubular plug 15 internally threaded to the rear end of the barrel. This structure constitutes the secondary shock absorbing mechanism.

The tubular plug 15 provides a chamber for receiving a tubular spring seat 16 and a rotatable base 17. The seat and base are formed with annularly spaced fingers or prongs, respectively 18 and 19, disposed axially of the chamber and towards one another so that they may be interfitted upon relative axial movement. One of the fingers 18 of the seat may be keyed as at 18a (Fig. 5) to the plug to prevent rotation of the seat. The base 17 is formed with a radial finger 20 extending through a slot 21 in the plug 15 and terminating exteriorly in a thumbpiece 22. The side walls of the slot limit rotary movement of the finger and base and define positions in which the fingers 18 and 19 are in or out of alignment.

The base is held against rearward movement by means of a disc 23 threadedly secured to the hollow plug 15. The seat includes a reduced tubular extension 24 projecting through the plug and establishing a collar 25 (Fig. 2) engageable with the shoulder 26 of the plug whereby forward movement is limited. In the preferred embodiment of the invention a plunger 27 inserted through the tubular extension has an enlarged head 28 disposed in the base within the seat 16 and engageable with an internal shoulder 29 in the seat. The head is preferably octagonal to fit within the fingers 18 and be held thereby against rotation.

A combined compression and torsion spring 30 confined between the base 17 and in the present instance the head 28 of the plunger and anchored in each of these members serves to hold the base and the seat against their respective stops and maintains the fingers 18 and 19 longitudinally spaced and circumferentially aligned. This is the normal non-telescoping position of the mating parts and is controlled by engagement of the radial finger 20 with one wall 21a of the slot 21. When the base is rotated by moving the radial finger 20 against the opposite wall 21b of the slot the longitudinal fingers of one member are disposed to enter the interspaces between the fingers of the other member.

The forward end of the plunger 27, carries a primary impact member 31 which may be attached both by the threaded connection 32 and a pin 33. The impact member 31 projects beyond the impact member 9 and has a head 34 adapted to be received in a recess 9a of the member 9.

A compression spring 35 embracing the plunger is confined by and between the seat 16 and the impact member 31.

In Fig. 1 the parts are all arranged in the normal position. When the impact member 31 is struck a blow the spring 35 is compressed because the fingers 18 and 19 are in alignment and the seat 16 is thereby held against rearward movement. If the blow is severe enough to cause the impact member 31 to strike the impact member 9 (Fig. 2) then the shock is transmitted to the wedges 13 and rings 14.

When it is desired to retract the impact member 31 without encountering the opposition of the spring 35, the base 17 is rotated by acting on the thumbpiece 22 to permit rearward movement of the spring seat 16 as shown in Fig. 3. The spring 30 restores the plunger and spring seat to the forward position and when the thumbpiece 22 is released it will counterrotate the base to its normal position to realign the fingers 18 and 19.

This method of inoperating one of the elements of the shock absorbing mechanism finds particular application in machine guns where the recoiling parts must occasionally be manually reciprocated as in loading the gun. It is with this particular purpose in view that the return of the base to operative position is automatically effected by the torque action of the spring 30. In other applications of the device such automatic return may not be required or desired and accordingly it is within the purview of the invention to omit the torque action of the spring 30.

Since the alignment or non-alignment of the fingers 18—19 is dependent on relative rotational displacement it is to be understood that such displacement may be accomplished by rotating either or both of the concerned members as convenience may suggest.

We claim.

1. In a compound shock absorbing mechanism, a support, a barrel secured to the support, an impact member fitting in the barrel and projecting through the support, wedge rings in the barrel in rear of the impact member, resilient rings in rear of the wedge rings, a tubular plug secured to the barrel and confining the resilient rings, a base rotatably mounted in the rear end of the plug, forwardly directed fingers on the base, a tubular spring seat in the other end of the plug and projecting therethrough, rearwardly directed fingers on the seat, a plunger mounted in the seat and having an enlarged head engageable with the seat, a compression spring anchored in the head of the plunger and in the base, an impact member on the plunger projecting beyond the impact member in the barrel, and a spring confined between said impact member and the spring seat.

2. In a compound shock absorbing mechanism, a support, a barrel secured to the support, an annular shock absorbing device in the barrel, a tubular plug secured to the barrel and retaining said device, a base rotatably mounted in the rear end of the plug, forwardly directed fingers on the base, a tubular spring seat in the other end of the plug and projecting therethrough, rearwardly directed fingers on the seat, a plunger mounted in the seat for limited sliding movement and projecting through the support, and a compression spring anchored in the plunger and the base.

3. In a compound shock absorbing mechanism, a support, a barrel secured to the support, an annular shock absorbing device in the barrel, a tubular plug secured to the barrel and retaining said device, a plunger within said annular shock absorbing device, a spring opposing retraction of the plunger and means for inoperating the spring.

4. In a compound shock absorbing mechanism, a support, a barrel secured to the support, an impact member fitting in the barrel and projecting through the support, wedge rings in the barrel in rear of the impact member, resilient rings in rear of the wedge rings, a tubular plug secured to the barrel and confining the resilient rings, and a shock absorbing device including means whereby it may be rendered inoperative, said device disposed within the rings and plug.

5. In a shock absorbing mechanism, a support, a base rotatably mounted in the support, forwardly directed fingers on the base, a tubular spring seat slidably mounted in the support, rearwardly directed fingers on the seat, a plunger slidably mounted in the spring seat and having a head engageable therewith, a spring confined between the spring seat and the plunger normally maintaining the head of the plunger in engagement with the spring seat, and a compression spring anchored in the base and the head of the plunger and normally maintaining the fingers on the base and spring seat in alignment.

6. In a shock absorbing mechanism, a support, a base rotatably mounted in the support, forwardly directed fingers on the base, a tubular spring seat slidably mounted in the support, rearwardly directed fingers on the seat, a plunger slidably mounted in the spring seat and having a head engageable therewith, a spring confined between the spring seat and plunger and normally maintaining the head of the plunger in engagement with the spring seat, and a compression spring between the base and the head of the plunger.

7. In a shock absorbing mechanism, a support, a reciprocable plunger in the support, a reciprocable spring seat between the plunger and support and seating on each of these members, a spring confined between the seat and the plunger, means selectively positionable in or out of the path of movement of the seat, a spring normally maintaining said means in the path of the spring seat and acting on the plunger to normally hold the plunger and spring seat at the forward limit of their stroke.

8. In a shock absorbing mechanism, a support, a spring seat slidable in the support and engageable therewith to limit its forward stroke, a plunger slidable in the spring seat and engageable therewith to limit its forward stroke, a spring confined between the plunger and spring seat, means selectively positionable in or out of the path of movement of the spring seat and a spring normally maintaining said means in the path of the spring seat and acting on the plunger to move the spring seat to the forward limit of its stroke.

9. In a shock absorbing mechanism, a support, a spring seat slidable in the support and engageable therewith to limit its forward stroke, a plunger slidable in the spring seat and engageable therewith to limit its forward stroke, a spring confined between the plunger and spring seat, means selectively positionable in or out of the path of movement of the spring seat, and resilient means acting on the plunger for moving the spring seat to the forward limit of its stroke.

10. In a shock absorbing mechanism, a support, a spring seat slidable in the support and engageable therewith to limit its forward stroke, a plunger slidable in the spring seat and engageable therewith to limit its forward stroke, a spring confined between the plunger and spring seat, means selectively positionable in or out of the path of movement of the spring seat, and means for moving the spring seat to the forward limit of its stroke.

11. In a shock absorbing mechanism, a support, a spring seat slidable in the support and engageable therewith to limit its forward stroke, a plunger slidable in the spring seat and engageable therewith to limit its forward stroke, a spring confined between the plunger and spring seat, means controlling movement to the spring seat, and means for moving the spring seat to the forward limit of its stroke.

12. In a shock absorbing mechanism, a support, a spring seat slidable in the support and engageable therewith whereby its forward stroke is limited, a plunger, means whereby the forward stroke of the plunger is limited by the spring seat, a spring confined between the plunger and spring seat, and resilient means normally holding the spring seat at the forward limit of its stroke.

13. In a shock absorbing mechanism, a support, a spring seat slidable in the support, and engageable therewith whereby its forward stroke is limited, a plunger, means whereby the forward stroke of the plunger is limited, a spring confined between the plunger and spring seat, and resilient means normally holding the spring seat at the forward limit of its stroke.

14. In a shock absorbing mechanism, a support, a spring seat, a plunger, a spring confined between the spring seat and plunger, means for inoperating the spring seat, and means for restoring the spring seat to operative position after it has been inoperated.

15. In a shock absorbing mechanism, a support, a spring seat, a plunger, a spring confined between the spring seat and plunger, and means for inoperating the spring seat.

WILLIAM R. BULL.
CLARENCE E. SIMPSON.